INVENTOR.
HARRY W. MOORE
BY
Dybvig & Dybvig
HIS ATTORNEYS

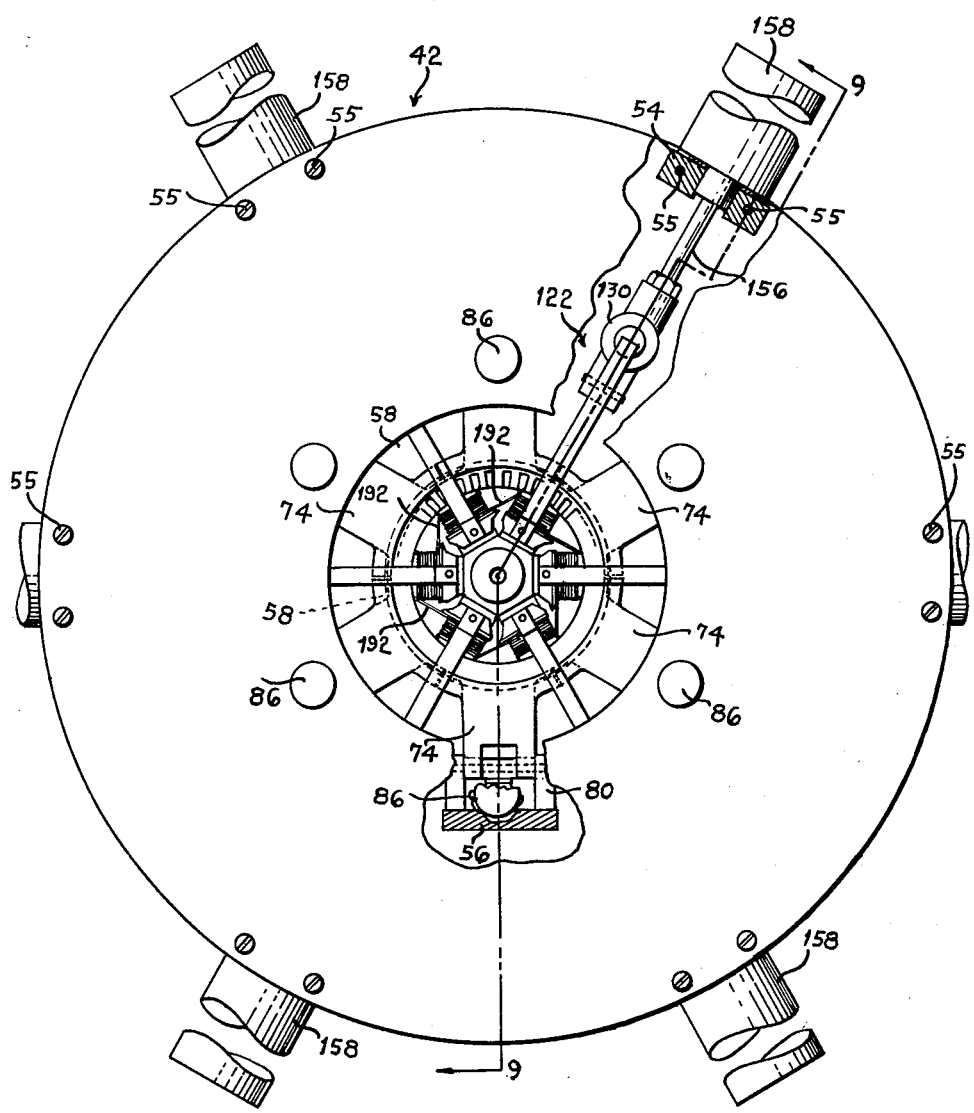

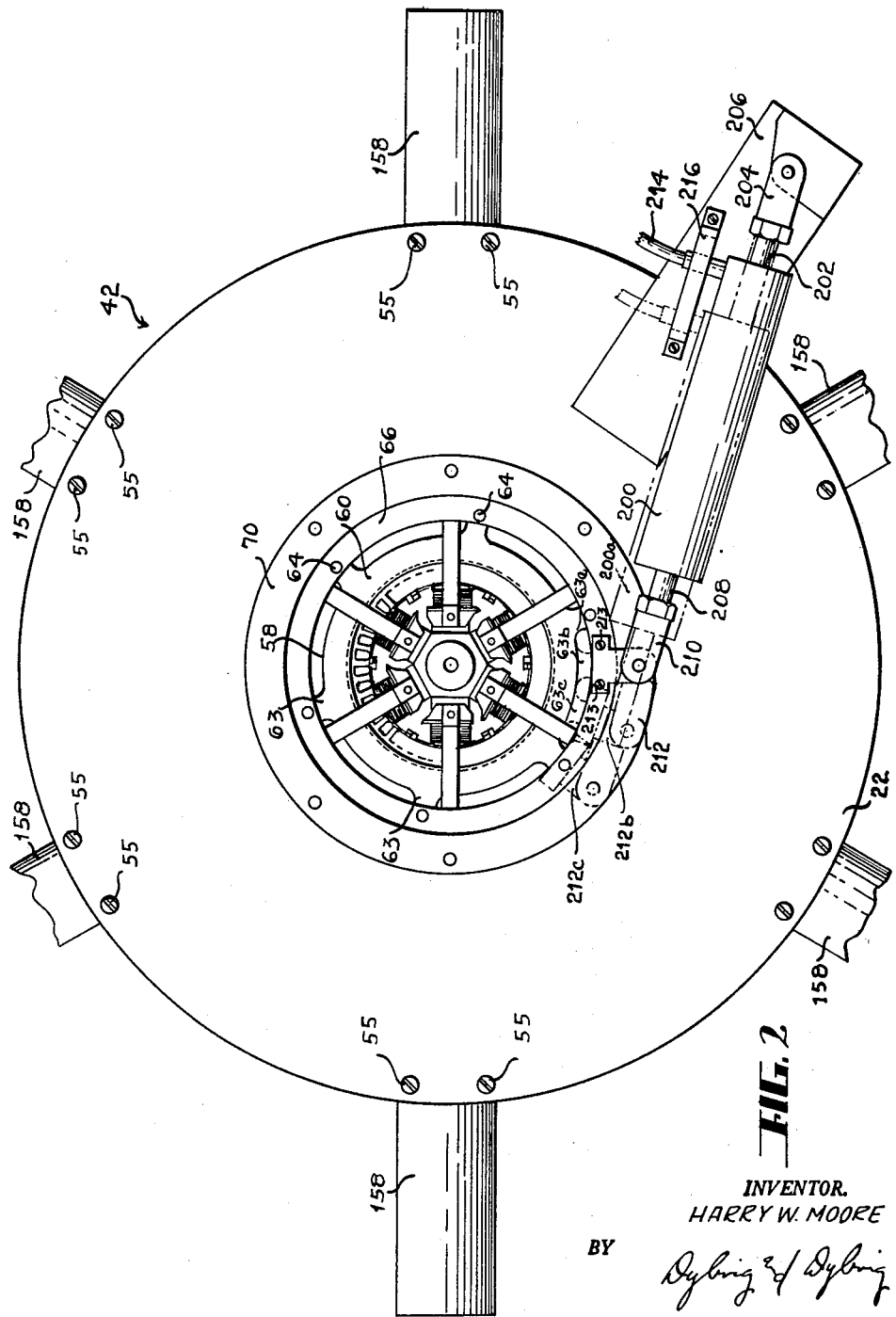

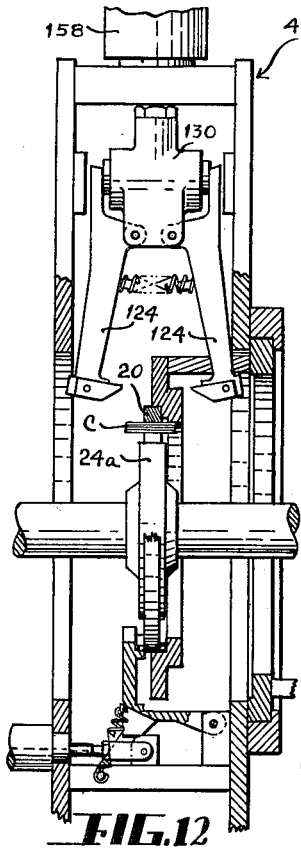
FIG.12
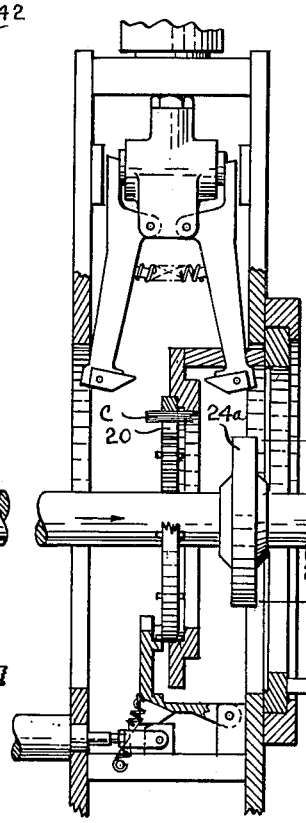
FIG.13
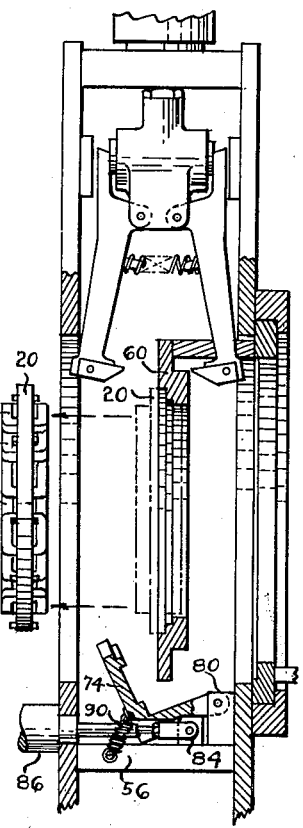
FIG.14
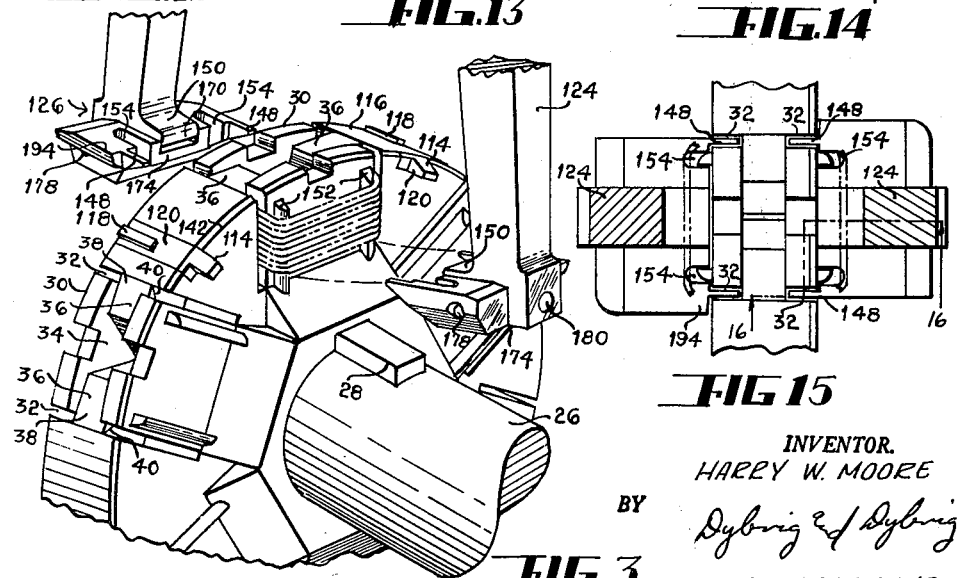
FIG.15
FIG.3
INVENTOR.
HARRY W. MOORE
BY
HIS ATTORNEYS July 13, 1965 H. W. MOORE 3,193,913
COIL TRANSFERRING MACHINE
Original Filed Sept. 2, 1960 6 Sheets-Sheet 4

July 13, 1965 H. W. MOORE 3,193,913
COIL TRANSFERRING MACHINE
Original Filed Sept. 2, 1960 6 Sheets-Sheet 5

INVENTOR.
HARRY W. MOORE
BY
Dybvig & Dybvig
HIS ATTORNEYS

United States Patent Office 3,193,913
Patented July 13, 1965

3,193,913
COIL TRANSFERRING MACHINE
Harry W. Moore, 5051 Kittridge Road, Dayton, Ohio
Original application Sept. 2, 1960, Ser. No. 53,801, now Patent No. 3,137,931, dated June 23, 1964. Divided and this application Mar. 23, 1964, Ser. No. 363,659
2 Claims. (Cl. 29—155.5)

This application is a division of my copending application Serial No. 53,801, filed September 2, 1960, entitled "Coil Transferring Machine."

This invention relates to a machine for inserting coils from a dummy rotor or stator into slots in a field carrying member of a dynamoelectric device.

In one method of automatically winding coils in an annular field carrying member, such as a stator, the windings are first wound on a dummy field member. The dummy member is then placed centrally of the stator and the windings are removed from the dummy member and inserted into the stator slots. The mechanism for inserting the windings in the stator slots often is incorporated within the dummy member. However, such mechanisms are usually quite complicated and expensive in that several moving parts must be accurately positioned within the comparatively small confines of the dummy member.

In the past, various mechanisms separate from the dummy member have also been devised for transferring coils to stator slots. These, too, have not been altogether satisfactory. Often they must be manually reset or adjusted before each transferring operation, and the dummy member must be manually locked or loaded in position. Any manual operation, of course, reduces the speed with which the coils may be transferred.

The primary object of this invention is to provide an improved method for rapidly transferring coils deposited on a dummy member to a field carrying member of a dynamoelectric device.

Another object of this invention is to provide a coil transferring mechanism which is automatically reset after each transferring operation.

In my copending application, Serial No. 48,081, filed August 8, 1960, now Patent No. 3,156,268 entitled "Coil Winding Mechanism," a machine is described for simultaneously loading or depositing coils on a plurality of dummy rotors or stators which are mounted on a single arbor forming what may be termed a mandrel or coil accumulator structure. Each dummy member is provided with the coils required for a single phase winding of a field member to be used in a polyphase device. There are as many dummy members as there are phases, so that the accumulator structure accommodates all of the coils required for the polyphase field member. It is advantageous to transfer these coils to the stator slots by means of a single transfer mechanism.

Therefore, another object of this invention is to provide a method for inserting coils into the field member of a dynamoelectric device from a single accumulator structure having a plurality of dummy members mounted thereon. The method of this invention has been designed primarily for use with the mandrel or accumulator structure mentioned above. However, the method may be used with other dummy structures.

Other objects and advantages will become apparent from the following description.

Referring to the drawings:

FIGURE 1 is a front elevational view of a coil transferring machine made in accordance with this invention with a dummy member and a field carrying member in position to receive coils from the dummy member. Portions of the machine are broken away to more fully illustrate details thereof.

FIGURE 2 is a rear elevational view of the coil transferring machine of this invention.

FIGURE 3 is a perspective view of a portion of a dummy member mounted on an arbor along with a portion of a tong structure used for removing coils therefrom.

Figures 5, 6, 7:
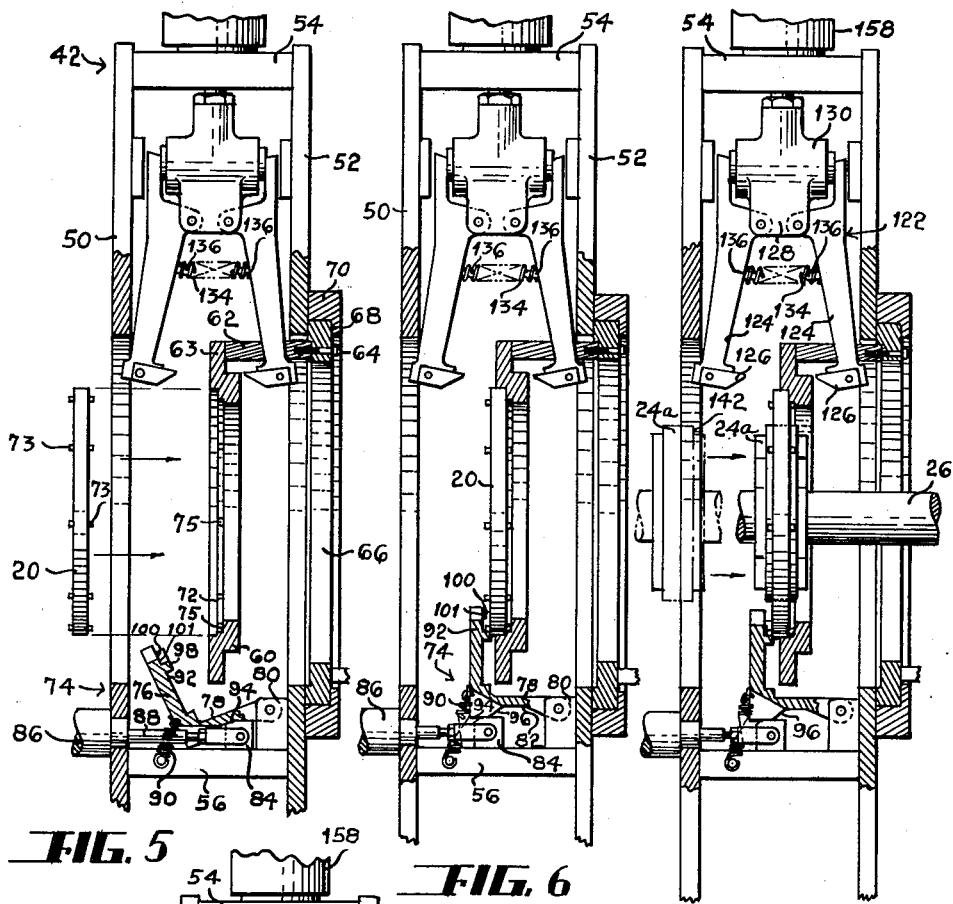
FIGURE 5 is a partial sectional view of the coil transferring machine, taken along lines 5—5 of FIGURE 1, showing the position of the machine elements as it begins its initial operation.

FIGURES 6, 7, 8, 9, 10, 11, 12, 13 and 14 are sectional views similar to FIGURE 5 illustrating the sequence of operation of the machine of this invention. In FIGURE 9, a larger portion of the machine is shown. Also in FIGURE 9, an air cylinder is in section to disclose details thereof.

FIGURE 15 is a sectional view taken along lines 15—15 of FIGURE 9, illustrating the manner of engagement of the tongs with the dummy member.

FIGURE 16 is a sectional view, taken along lines 16—16 of FIGURE 15, of a portion of one of the tong arms.

Figure 17:
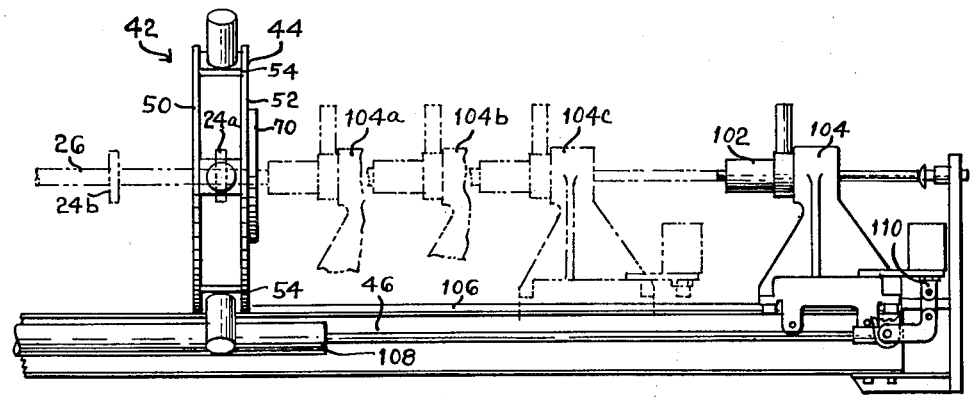

FIGURE 17 is a diagrammatic view illustrating the manner in which the transferring mechanism and the arbor of an accumulator structure are supported.

Figure 18:
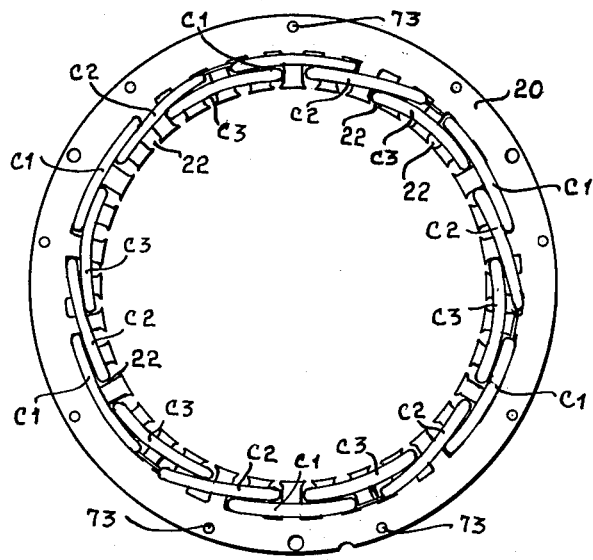

FIGURE 18 is an elevational view of a stator which has been provided with coils by a mechanism made in accordance with this invention.

Referring to FIGURE 18, which shows a ring shaped field member 20 (hereinafter called a stator frame) having thirty-six radially inwardly directed slots 22, the coils for a twelve pole, three phase motor may be arranged as follows.

Six coils $C_1$ form the first phase. These lie in the bottom of equally spaced pairs of slots. Thus, each coil $C_1$ straddles two slots and is separated from the immediately adjacent coils $C_1$ by two slots. Six coils $C_2$ form the second phase windings. These are similarly equally spaced about the circumference of the stator. However, these coils must be displaced by 120 electrical degrees, i.e., 20 mechanical degrees, from the first phase coils. Since there are 36 slots, the distance between slots is 10°. Accordingly, the ends of the coils $C_2$ are deposited a distance of two slots away from the ends of the coils $C_1$. Therefore, one end of each coil $C_2$ overlies a portion of a coil $C_1$, while the other end of each coil $C_2$ lies in the bottom of a slot 22. Six coils $C_3$, forming the third phase, are then deposited such that their ends are displaced by 240 electrical degrees from the ends of the $C_1$ coils. This involves a shift in position of 40 mechanical degrees from the $C_1$ coils. Accordingly, one end of each coil $C_3$ overlies a coil $C_2$ while the other end overlies a coil $C_1$.

Rather than winding the coils $C_1$, $C_2$ and $C_3$ directly on the stator frame 20, the coils are first deposited on a plurality of dummy members 24 (see FIGURES 3 and 4), there being one member 24 for each phase. Thus, for winding the twelve pole, three phase stator described above, three cylindrical dummy members 24a, 24b and 24c are fixedly mounted on a common arbor 26 by means of keys 28. Each dummy member has six coil-receiving portions 30 equally spaced about its periphery. The coil-receiving portions 30 on each of the members 24a, 24b and 24c are aligned one behind the other. Each coil-receiving portion 30 is defined on its sides by a pair of parallel coil-retaining slots 32, each pair of parallel slots 32 being parallel to the radius extending between the slot pair. The coils $C_1$ are deposited in the member 24a, the coils $C_2$ in the member 24b and the coils $C_3$ in the member 24c. The center of each portion 30 is cut out to form a cavity 34 in which a pair of blocking plates 36 are pivotally mounted. The blocking plates 36 are spring biased by means not shown in the drawings but described in detail in the aforementioned application, whereby a flange 38 on each plate projects over its adjacent slot 32 near the periphery of the dummy member. The lower face 40 of the flanges 38 are sloped downwardly and inwardly to the center of the coil-receiving portion 30 to provide a cam surface. As a coil is removed from the portion 30, the top surface of the coil cams the blocking plate out of position. Thus, while the blocking plates are biased to hold the coils within the slots 32, the plates may easily be pivoted to open the slots when it is desired to remove the coils.

To load the stator frame 20 with coils, any one of the dummy members may be placed within the frame 20 so that the outer periphery of the dummy member is contiguous to the inner periphery of the stator frame and the pairs of coil-retaining slots 32 in the dummy member communicate with pairs of slots 22 in the field member. The coils deposited in the slots 32 are then lifted radially outwardly and inserted in the stator slots. While this could be performed manually, the operation would be costly and time consuming. In accordance with this invention, a coil inserting machine 42 has been devised whereby the coils may be removed from the dummy member and inserted into the field member slots in a matter of seconds.

The coil inserting mechanism 42 includes an annular support frame 44 fixedly mounted on a base 46 (FIGURE 17). The frame 44 comprises a forward annular disc-shaped frame plate 50 and a rearward annular frame plate 52 mounted coaxially therewith. The plates 50, 52 are held in spaced, parallel relationship by a plurality of outer mounting brackets 54 attached to the plates by screws 55 or the like, and an equal number of inner mounting brackets 56 (see FIGURES 1 and 5, for example). The outer brackets 54 are equally circumferentially spaced about the periphery of the plates 50 and 52. In the specific example illustrated in the drawings, there are six brackets 54. Accordingly, the brackets are spaced by 60°. The inner brackets, which are nearer the axis of the frame than the outer brackets, are likewise equally circumferentially spaced by 60°. However, each inner bracket 56 is located between a pair of outer brackets 54, for reasons which will later be made apparent.

The frame plates 50 and 52 are identical in size and shape. Each is disc-shaped and each has a central aperture 58, whereby a stator frame 20 and an accumulator structure may be supported therebetween. The means for supporting the stator frame comprises a retaining ring 60 (FIGURES 1, 2 and 5) located centrally of the frame 44 so as to lie nearly midway between the plates 50, 52 but closer to the rear of the plate 52, with its forward face lying substantially parallel to the plane of the plates and coaxially with the apertures 58. The ring 60 is held in position by a plurality of horizontal spacer bars 62, only one of which is shown in the drawings. One end of each of the bars 62 is attached to a radially directed flange 63 on the ring 60. (See FIGURE 1.) The other end is attached, as by screws 64, to a stator indexing ring 66 which is rotatably mounted within an annular recess 68 in a ring-shaped mounting bracket 70 attached to the outer face of the rear plate 52. The forward face of the retaining ring 60 is stepped so as to provide a bearing surface 72 which is likewise parallel to the plane of the plates 50, 52.

The stator 20 to be loaded with coils is placed substantially midway between the frame plates 50, 52 within the retaining ring 60. The side faces of the stator frame are provided with a plurality of equally spaced lugs 73. The lugs 73 on the rear face of the stator frame engage within cooperating recesses 75 in the bearing surface 72 so that, as will be described more fully later, as the retaining ring 60 undergoes rotation, the field member will likewise rotate. The field member 20 is loosely clamped in position on the retaining ring by means of a plurality of clamps 74. One clamp 74 is mounted on each of the inner brackets 56. All of the clamps 74 are identical; therefore, only one is shown in the drawings and only one need be described. As shown in FIGURES 5 and 6, each clamp 74 comprises a right-angled clamp arm 76 having a generally horizontal arm portion 78 pivoted to a yoke or bracket 80 mounted on both the internal face of the rear disc 52 and on its mounting bracket 56. The arm portion 78 is recessed to provide a crescent-shaped channel or recess 82 for receiving a clamp actuating bar 84 which is slidably mounted upon the bracket 56. The actuating bar 84 is driven by a clamp actuating cylinder 86 mounted on the front face of the forward disc 50 having a piston rod 88 connected to the bar 84, so that, as the piston rod 88 is actuated, the bar 84 slides back and forth between the discs 50 and 52 along the bracket 56. When the retaining ring 60 is empty, the piston rod 88 is extended so that the actuating bar 84 lies adjacent the bracket 80 and within the channel 82, as shown in FIGURE 5. A spring 90, which is engaged between the other, generally vertical, arm portion 92 of the clamp arm 76 and its adjacent mounting bracket 56, biases the arm 76 in a counterclockwise direction about the bracket 80 away from clamping engagement with the retaining ring 60. After the stator frame 20 is placed into position against the bearing surface 72 as shown in FIGURE 6, the cylinder 86 is actuated to slide the actuating bar 84 toward the forward plate 50 whereby a cam surface 94 provided forwardly on the bar 84 engages a cam 96 on the forward portion of the recess 82 to pivot it into a clamping position. The cam 96 is bifurcated to straddle the piston rod 88. The rear face of the generally vertical portion 92 is flanged at 98 to provide a supporting surface 100 beneath the stator frame 20. The inner face of the arm portion 92 above the flange 98, indicated at 102 in FIGURES 5 and 6, is spaced from the forward face of the stator frame by an amount slightly greater than the length of the lugs 73 extending forwardly therefrom. Accordingly, the stator frame is permitted a slight freedom of movement, or "play," even when clamped on the retaining ring 60.

After the stator frame 20 has been clamped to the retaining ring 60, as shown in FIGURE 6, the dummy member 24a, which is loaded with coils, is positioned within the stator frame as shown in FIGURE 7. To move the member 24a into the stator frame, the end of the arbor 26 nearest the member 24a is locked in a centering chuck 102 (FIGURE 17) which holds the arbor substantially in the axis of the frame 46. The chuck 102 forms a part of a tailstock 104 slidably mounted on a bed 106 provided on top of the base 46. Any suitable drive mechanism, such as the cylinder and piston arrangement 108, may be used to adjust the position of the tailstock along the bed 106. Also, the tailstock may be accurately locked into any predetermined adjusted position by any suitable stop mechanism, such as the hydraulically actuated clamp 110 shown in FIGURE 17. These parts may be conventional and form no part of the instant invention except insofar as they provide means to move the accumulator structure axially through the coil inserting mechanism 42. Accordingly, a more detailed description of the tailstock is believed unnecessary.

When the arbor 26 is first clamped in the chuck, the tailstock 104 may occupy a position forwardly or to the left of the position 104a indicated by phantom lines in FIGURE 17. The tailstock is then moved rearwardly to the position 104a wherein the dummy member 24a is moved axially in the direction of the arrows in FIGURE 7 to be positioned concentrically within the bore of the stator frame 20.

During rearward movement of the member 24a, any misalignment of the dummy member with respect to the stator frame could damage the dummy member and the teeth which separate the slots 22 in the stator frame.

Since the accumulator is supported at only one end by the centering chuck 102, it may sometimes be out of alignment. Accordingly, the leading peripheral edge 142 of each dummy member (as viewed in FIGURE 7) is beveled and provided with a plurality of circumferentially spaced tapered guide pins 114 shown most clearly in FIGURE 3. Since the stator frame is loosely clamped within the ring 60, a small amount of relative movement may take place between the stator frame and the dummy member when the guide pins 114 enter the stator frame. Accordingly, there is no danger of damage due to vertical misalignment of the dummy member and the stator frame. To insure proper alignment of the coil-receiving slots 32 in the dummy member with the slots 22 in the stator frame, the outer circumferential face 116 of each of the members 24 are provided with keys 118, each of which engages within a slot 22 in the stator located between the slots to be provided with coils. The pins 114 and the keys 118 may be integral with slugs 120 which are fit within recesses cut in the face 116.

After the dummy member 24a is placed in the position indicated by full lines in FIGURE 7, the coils deposited thereon are transferred and inserted into the stator slots 22 which communicate with the slots 32 in the member 24a. This is accomplished by a plurality of radially extending tongs 122 mounted between the plates 50 and 52. Each of the tongs 122 includes a pair of tong arms 124 having a coil engaging portion comprising a lifting finger structure 126 attached to their lower or radially innermost end portions. An intermediate portion of each arm 124 is pivotally attached to a radially inwardly extending bifurcated bracket or yoke 128 disposed on the base of a compound, tong operating air cylinder 130. As shown in FIGURES 5 through 8, a compression spring 134, which encircles a transversely extending stud 136 mounted on the side of each arm 124, normally causes the fingers 126 to be separated sufficiently to straddle the ring 60, stator frame 20 and dummy member 24a. To force the fingers 126 toward each other, a pair of pistons 138 (FIGURE 9) are slidably mounted along a transverse path parallel to the axis of the frame within the cylinder 130. Each piston drives a pin 140, mounted on its outer end, which engages a radially outwardly extending flange 144 integrally disposed on each arm 124 above their pivot points. As is apparent, air may be introduced into the cylinder between the pistons 138 whereby the flanges 144 are separated and the lower portions of the arms 124 are moved one toward the other about the pivots provided on the yoke 128.

As shown most clearly in FIGURES 3, 15 and 16, each finger structure 126 includes a pair of parallel prongs 148 adapted to fit within the coil-receiving slots 32 beneath the ends of the coil therein. Additionally, the finger structure 126 includes an inwardly directed lifting surface 150 adapted to engage beneath the side of a coil, such as that illustrated in FIGURE 3, and between a pair of spacer bars 152 mounted adjacent the slots 32. The spacer bars 152 introduce a gap between the side of the coil and the dummy member. The finger structure is also provided with slots 154 so as to straddle the spacer bars 152. With this arrangement, as shown in FIGURES 9 and 15, when the tong arms 124 are moved one toward the other, the prongs 148 enter the slots 32 beneath the ends of the coil and the surfaces 150 abut the side of the accumulator beneath the sides of the coil. The fingers 126 will be described in greater detail below.

Figure 8:
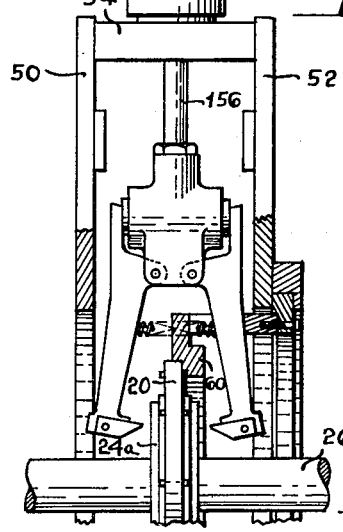

The operation of one of the tongs is illustrated in FIGURES 5 through 12 and is as follows. The air cylinder 130 is mounted transversely on a radially extending and reciprocal piston rod 156 by means of a threaded coupling between the top of the cylinder 130 and the rod 156. The piston rod 156 is driven by a double-acting tong actuating cylinder 158 mounted on one of the outer brackets 54. While the stator frame 20 and the member 24a are moved into position within the ring 60 as shown in FIGURES 5, 6 and 7, the tongs are held radially outwardly by the cylinder 158. As shown in FIGURES 1 and 8, the cylinder 158 is then energized to actuate the tongs radially inwardly toward the axis of the frame whereby the fingers 126 straddle the members 20 and 24a. Next, as shown in FIGURES 9 and 15, air is supplied to the cylinder 130 between the pistons 138 to separate the flanges 144 and cause the fingers 126 to move one toward the other to interengage with the dummy member. As described earlier, the prongs 148 engage the ends of the coil C within the slots 32 and the surfaces 150 engage beneath the sides of the coil C. The cylinder 158 is then energized to withdraw the tongs from the dummy member 24a, as shown in FIGURE 10, thereby removing the coil C from the dummy member and inserting it into a pair of slots 22 in the stator frame 20. As stated earlier, when the coil is raised or withdrawn, the top of the coil cams the blocking plates 36 out of their blocking position. The insertion of the coil within the slots 22 is thus completed.

To insure that no damage is done to the coil by raising it too far, a stop plate 160 is affixed, as by screws 161 (FIGURE 9), centrally of the internal face of each plate 50, 52 adjacent the tong arms 124. After a predetermined radially outward movement of the piston 156, the upper surface of each flange 144 engages the bottom of its adjacent plate 160, whereupon continued outward movement of the tong structure is blocked. The air is then released from the cylinder 130 by a release mechanism (not shown) whereupon the compression spring 134, as shown in FIGURE 11, moves the fingers 126 outwardly out of engagement with the coil C. The tongs are then permitted to raise to their original starting position, as shown in FIGURE 12.

Only one tong structure has been described but, as mentioned before, there are several tongs 122 equally circumferentially spaced between the discs 50, 52, each of which lies on a line extending radially from the axis of the frame. There are as many tong structures as there are coil-receiving portions on the accumulator. In the example disclosed, the dummy members are provided with six coil-receiving portions. Accordingly, there are six tong structures. Of course, there are also six mechanisms for controlling the operation of the tongs. That is, the cylinders 130, 158 and the pairs of stop plates 160 are duplicated for each of the tongs. The clamps 74 lie midway between adjacent tong structures. Therefore, there are six clamps 74. As shown in FIGURES 1 and 2, the sides of the tong fingers 126 slope radially inwardly. Thus, each of the fingers 126 may occupy their innermost position at the same time. Since, in addition the tongs 122 are located on circumferentially spaced radial lines, they may be simultaneously moved radially inwardly and all of the coils on the member 24a may be simultaneously inserted into the coil-receiving slots 22 in a matter of seconds.

The coils formerly positioned on the dummy member 24a are thus accurately positioned within the stator slots. Normally, the coils will stay in position until suitable means, such as wedges (not shown) are positioned with the slots to hold the coils in place. However, where there are a comparatively large number of turns of wires in each coil, the coils may tend to unravel or slide out of the slots. To prevent unraveling, the central portions of the coils may be moved outwardly by a greater distance than their ends. Thus each of the coils are somewhat arcuate as shown in FIGURE 18. This causes the ends of the coils to tightly engage the sides of the teeth separating the slots 22. The arcuate configuration of the coils is obtained by the special construction of the fingers 126. Referring again to FIGURES 3 and 16, each finger 126 is made in two parts. The lifting surface 150 is machined on the lower portion of its arm 124 and is the top surface of a boss 170 abutting from the front side of the arm 124. The lower portion of the arm also is provided with a transverse aperture 172. The prongs 148 are connected by a transverse bar 174 extending therebetween and beneath the boss 170. The prongs are pivotally attached to the arm 124 by a dowel pin 176 which extends through an aperture 178 in each prong and through the aperture 172 in the arm 126. The pin 176 is locked within the aligned apertures 172 and 178 by means of a set screw 180. With this arrangement, the prongs may pivot about the dowel pin 176 in a counterclockwise direction until the rear face 182 of the bar 174 engages the forward face of the arm 126, and in a clockwise direction until the top face 184 of the bar 174 engages the bottom surface of the boss 170. A spring 186, which is housed within a recess provided in the lower face of the boss 170 and engaged with the top face 184 of the bar 174 biases the prongs 148 in a clockwise direction so that the upper surfaces of the prongs are normally lower than the lifting surface 150. However, the bottom surface 188 of the bar 184 is sloped to provide a cam which engages the base portions 190 of the slots 32. Therefore, when the prongs 148 are inserted into the slots 32, they are cammed upwardly so that the upper surface of the prongs 148 and the surface 150 are substantially coplanar. As the arms 124 are raised from the position shown in FIGURE 9 to that shown in FIGURE 10, the prongs 148 are elevated out of engagement with the base portions 190 whereupon the spring 186 biases the prongs downwardly so that their top surfaces lie beneath the plane of the surface 150. In this way, the fingers may be inserted beneath the coil without difficulty, yet the surface 150 elevates the sides of the coils slightly above that of the ends elevated by the prongs 148 for the reasons discussed above.

Since all of the coils mounted upon the member 24a are intended to be used in a single phase of the winding of the stator, they are connected by lead-in wires 192 (FIGURE 1). In order to raise the lead-in wires along with the coils, they are engaged by an abutment 194 provided on one side of the prongs 148 which extends laterally over the portion of the dummy member separating adjacent pairs of coil-receiving slots. Therefore, as the coils are raised by the fingers 126, the lead-in wires will also be raised.

After all of the coils forming the first phase of the stator winding are inserted into the slots 22, the empty dummy member 24a is then moved out of engagement with the stator frame 20 in the direction of the arrows in FIGURE 13. Next, the dummy member 24a is moved into position within the bore of the stator frame by movement of the tail stock to the position 104b illustrated in FIGURE 17. Prior to insertion of the member 24b into the stator frame 20, the frame and the dummy member must be relatively rotated or indexed by 20° so that the coils wound on the dummy member 24b when transferred to the stator frame 20 will be displaced by 20° with respect to the first phase coils previously inserted in the slots. In the presently preferred embodiment, the stator frame is rotated or indexed by a mechanism, shown best in FIGURES 2 and 9, including a conventional compound, double-acting air cylinder 200. The indexing cylinder 200 drives a first piston rod 202 having a link 204 fixedly mounted on its upper end. The link 204 is pivotally attached to a mounting bracket 206 mounted on the rearward frame plate 52. A second piston rod 208 is slidably mounted within the base of the cylinder 200 and is provided with a link 210, which may be identical to the link 204. The link 210 is pivotally mounted on a bracket 212 which is fixedly attached to the indexing ring 60 by screws 213 or the like. The cylinder 200 is provided with air through an air line 214 attached thereto which may be slidably clamped to the bracket 206 by means of an apertured retaining plate 216. When fluid is introduced into the cylinder 200 through the line 214, it moves relative to the first, fixed piston rod 202 from the position shown in full lines to that shown by dotted lines 200a in FIGURE 2. At this point, the second piston rod 208 has not been actuated. Movement of the cylinder 200 moves the bracket 212 to the position indicated at 212b, thus causing the indexing ring 66 to rotate within the recess 68 by 20°. Since the ring 66 is connected with the retaining ring 60 by means of the spacer bars 62, the ring 60 also rotates.

Figure 4:
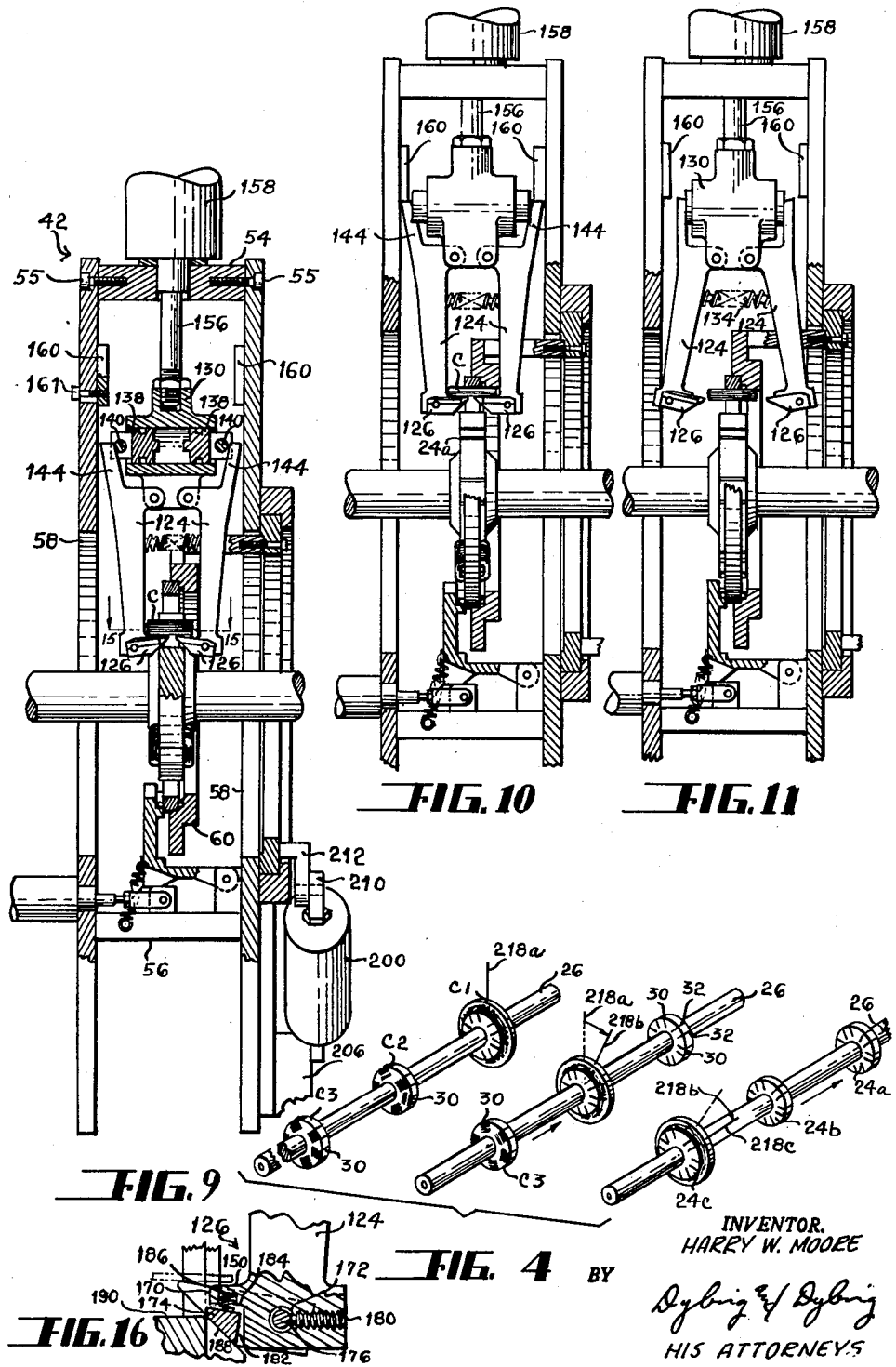
FIGURE 4 is a diagrammatic perspective view showing a mandrel or accumulator structure and stator frame in three different stages of operation of the transferring machine.

Thus, when fluid is first introduced into the cylinder 200, the retaining ring 60 and accordingly the stator frame 20 will be rotated by a predetermined amount, in this case by 20°, as indicated by the lines 218a, 218b in FIGURE 4. The dummy member 24b may then be positioned within the stator frame 20. The operation of the tongs 122 as described above with reference to the coils $C_1$ forming the first phase is then repeated for the second phase coils $C_2$ deposited on the dummy member 24b. Subsequently, the dummy member 24b is removed from engagement with the stator frame by movement of the tailstock from position 104b toward the position 104c. Before the dummy member 24c is placed within the stator frame, however, the cylinder 200 is supplied with more air whereupon the second piston rod 208 is actuated to move the bracket 212 into the position 212c shown in FIGURE 2. The stator is accordingly indexed by another 20° as indicated by the lines 218b and 218c in FIGURE 4. Movement of the tailstock is continued until it reaches the position 104c wherein the member 24c is positioned within the stator frame. The operation of the tongs 122 is again repeated so as to insert the coils forming the third phase into the stator slots 22 whereupon the stator frame is completely provided with coils as shown in FIGURE 18. The cylinder 200 may then be energized to return the retaining ring to its original position. Note that the spacer bars 62 are positioned so as to move in an arc between the tongs 122, as indicated by the position of one of the flanges 63 at 63a, 63b and 63c in FIGURE 1. Thus, the tongs do not interfere with the indexing of the stator.

After all of the coils on the mandrel or accumulator have been transferred to the stator frame, the tailstock 104 is moved by cylinder 108 to its rearmost position shown in full lines in FIGURE 17 and the mandrel is removed. The cylinder then returns the tailstock to its initial position. At the same time, the cylinders 86 are actuated to return the actuating bars 84 to their position adjacent the yoke or bracket 80 whereby the springs 90 move the clamps 74 out of clamping engagement with the stator frame. The stator loaded with coils may then be removed from the stator retaining ring 60 in the direction of the arrows in FIGURE 14. Note that the position of the parts of the inserting mechanism in FIGURE 14 are identical to that shown in FIGURE 5. Accordingly, the machine is in condition to receive another field member. Thus, another stator frame could be wound with coils from another accumulator structure without any resetting or adjustment of the machine.

The entire operation of the inserting mechanism in loading a stator frame with coils for all three phases is performed within a few seconds. Advantageously, the arbor may be coursed axially through the apertures 58 so that the dummy members are easily positioned within the stator. Also, with this construction, additional accumulators may be rapidly moved into position on the transferring machine without interference from the empty accumulators. Since all of the mechanisms for transferring the coils are operated by air or hydraulic cylinders and since all of the coils for all of the phases may be initially mounted upon a common arbor, the operation of the mechanism may be made completely automatic by suitable circuitry (not shown) which selectively and intermittently controls the clamp actuating cylinder 86, the tong operating cylinders 130, 158, the tailstock actuating cylinder 108 and the indexing cylinder 200. Circuitry for selectively and intermittently controlling the cylinders can be provided in any conventional manner. Accordingly, it is believed unnecessary to explain such circuitry in this application.

While the mechanism described above is designed to transfer six coils from each of three dummy members into a stator frame, the same principles and the same basic structure can be used for transferring a greater or lesser number of coils for various types of dynamoelectric devices. Also the mechanism could be used with different mandrel or accumulator structures. While the terms "stator" and "stator frame" have been used extensively throughout the above description, these terms are exemplary only. It is apparent that the field member 20 could be a rotor.

Although the presently preferred embodiment of the method has been described, it will be understood that various changes may be made within the scope of the invention as defined in the appended claims.

Having thus described my invention, I claim:

1. The method of transferring coils into inwardly directed coil-receiving slots of an annular field member of a polyphase dynamoelectric device, comprising the steps of: placing a dummy member having coils forming one phase deposited in outwardly directed coil-receiving slots therein within the bore of an annular field member having inwardly directed coil-receiving slots with the outwardly directed coil-receiving slots of said dummy member aligned with some of said inwardly directed slots; transferring each of the coils from said dummy member slots to said inwardly directed slots; removing said dummy member from within said field member; placing a dummy member having coils forming a second phase deposited in outwardly directed coil-receiving slots therein within the bore of said field member with its outwardly directed slots aligned with at least some other of said inwardly directed slots; transferring each of the second phase coils from the last mentioned dummy member slots to the aligned inwardly directed slots of said field member; removing said last mentioned dummy member from within said field member, and repeating the foregoing operations as required to deposit the coils for all the phases in the slots of the field member.

2. The method of claim 1 wherein a plurality of dummy members are mounted on a common arbor and further including the steps of rotating said field member relative to said dummy members after the coils for said one phase have been transferred to the field member slots and further rotating said field member relative to said dummy members after each subsequent coil transfer step.

References Cited by the Examiner

UNITED STATES PATENTS

| | | | |
|---|---|---|---|
| 1,257,193 | 2/18 | Currie | 140—92.1 |
| 2,836,204 | 5/58 | Mason | 140—92.1 |
| 2,934,099 | 4/60 | Mason | 140—92.1 |

WHITMORE A. WILTZ, *Primary Examiner.*

JOHN F. CAMPBELL, *Examiner.*